United States Patent [19]

Kirby

[11] Patent Number: 4,560,023
[45] Date of Patent: Dec. 24, 1985

[54] POWER ASSISTED STEERING GEAR

[75] Inventor: Ian G. Kirby, Hockley, England

[73] Assignee: Ford Motor Co., Dearborn, Mich.

[21] Appl. No.: 630,180

[22] Filed: Jul. 12, 1984

[30] Foreign Application Priority Data

Jul. 19, 1983 [GB] United Kingdom ................ 8319425

[51] Int. Cl.⁴ .............................................. B62D 5/08
[52] U.S. Cl. .................................. 180/148; 180/132;
91/467; 91/375 A
[58] Field of Search ............. 180/148, 132; 91/375 A,
91/375 R, 466, 467, 462

[56] References Cited

U.S. PATENT DOCUMENTS

| 4,010,815 | 3/1977 | Strauff ................................. 180/132 |
| 4,063,490 | 12/1977 | Duffy .................................... 91/467 |
| 4,391,342 | 7/1983 | Nishikawa ........................... 180/132 |
| 4,449,601 | 5/1984 | Adams ................................. 180/148 |
| 4,459,896 | 7/1984 | Dauvergne ........................... 91/467 |
| 4,488,475 | 12/1984 | Masuda ................................. 91/462 |

FOREIGN PATENT DOCUMENTS 1234032 8/1968 United Kingdom .................. 91/467

Primary Examiner—Carl Stuart Miller
Attorney, Agent, or Firm—Donald J. Harrington

[57] ABSTRACT

A rack and pinion steering gear mechanism for a wheeled vehicle comprising an input shaft, a rotary fluid pressure control valve and a drive pinion for a rack wherein the pinion is located between the input shaft and the valve and wherein the pinion has a central opening for receiving therethrough a valve actuator rod and a torsion bar that connects the input shaft to the pinion.

1 Claim, 1 Drawing Figure

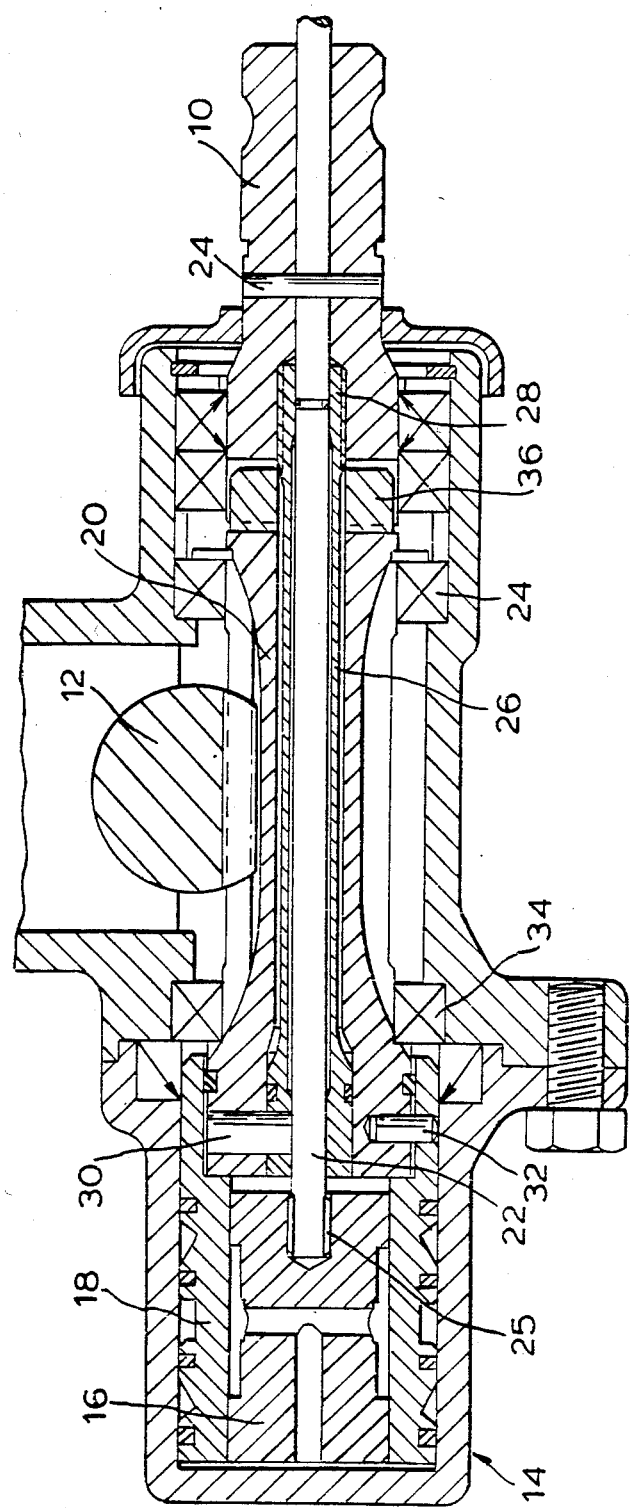

POWER ASSISTED STEERING GEAR

This invention relates to a power assisted steering gear for use with an automotive vehicle.

BACKGROUND OF THE INVENTION

On front wheel drive vehicles, the steering gear is mounted at the back of the engine compartment on the rear bulkhead. Space is limited in this region; and there are, therefore, packaging problems associated with the use of conventional power assisted steering gears in some vehicle models. Such gears have a valve for controlling hydraulic fluid flow arranged between the steering gear rack and the steering wheel as seen, for example, in Duffy U.S. Pat. No. 4,063,490, which is assigned to the assignee of this application. It is undesirable to locate the valve within the passenger compartment, and a conventional gear for such models, therefore, would project a long way into the engine compartment.

British Pat. No. 1,234,032 and U.S. Pat. No. 4,449,601 describe steering gears in which a rack and pinion is arranged between the valve and the steering wheel shaft. This results in a compact arrangement. However, it is considered necessary to provide torsional resistance to turning of the steering wheel to give steering "feel". In the gear disclosed in the British patent, tubular springs are provided in a special housing between the rack and pinion and the steering wheel. This arrangement has not proved satisfactory for production purposes since the characteristics of the springs used are not sufficiently uniform. Similarly, in the gear disclosed in the U.S. patent a C-spring is used to effect a steering "feel".

GENERAL DESCRIPTION OF THE INVENTION

The present invention comprises a power assisted steering gear having a pinion meshing with a steering rack, an input shaft and a control valve for controlling the flow of hydraulic fluid which, in use, moves the rack, the pinion and rack being positioned between the input shaft and the valve, the pinion being hollow and accommodating a torsion bar, the steering pinion further comprising an input shaft extension which connects the input shaft extension which connects the input shaft to the valve, one end of the torsion bar being rotationally fast with respect to the input shaft and the other end being rotationally fast with respect to the pinion.

DESCRIPTION OF THE DRAWING

The invention will be further described, by way of example, with reference to the accompanying drawing which is a cross section through a power assisted steering gear in accordance with the invention.

PARTICULAR DESCRIPTION OF THE INVENTION

The gear has an input shaft 10 which, in use, is connected to a steering wheel. A rack 12 (shown only in transverse cross section) is connected to steerable road wheels in a conventional manner, and is provided with a hydraulic actuator arrangement, not shown, which can move the rack in one longitudinal direction or the other. The actuator arrangement is controlled by a valve 14 which is also of conventional form, and has a rotor 16 and a sleeve 18. A pinion 20 extends between the input shaft 10 and the valve 14. Reference may be made to the Duffy patent mentioned above for a description of the mode of operation of a rotary valve such as valve 14.

An input shaft extension rod 22 is held fast with respect to the shaft 10 by a pin 24. The other end of the rod extends through a bore in the pinion 20, and engages, through splines 25, the valve rotor 16.

A tubular torsion bar 26 surrounds the rod 22. At one end 28, this bar is fixed to the input shaft 10, and at the other end it is fixed to the pinion 20 by a pin 30. The sleeve 18 of the valve 14 is also fixed to the pinion by a pin 32.

When the input shaft 10 is turned by the steering wheel, the valve rotor 16 is also turned through the rod 22. At the same time, the right hand end of the torsion bar 26 is turned. The pinion 20, however, is initially held stationary by the rack; and there is, therefore, a relative movement, as the torsion bar 26 twists, between the rotor 16 and the sleeve 18. This allows a controlled flow of hydraulic fluid through the valve which is directed to the hydraulic actuator arrangement to produce movement of the rack 12 in one direction or the other, and thus movement of the steering road wheels. The valve operation is conventional. Bearings 34 provide resistance to the axial thrust of the pinion 20. Safety dogs 36 allow steering control to be maintained manually in the event of a fluid failure in the power supply.

The positioning of the valve 14 on the opposite side of the rack 12 and the pinion 20 from the input shaft 10 makes it possible to reduce the distance between the input shaft and the location of the steering rack. The input shaft need be no longer than for a manual steering gear. Intrusion of the valve into the driver's foot area is avoided. Attachment of the pressure and return hoses to the gear is facilitated. Also, since the valve is remote from the input shaft, there is no need to provide a shield to prevent hot oil entering the passenger compartment in the event of a hose failure. Steering "feel" is provided by the tubular torsion bar 26.

Having thus described a preferred embodiment of my invention, what I claim and desire to secure by U.S. Letters Patent is:

1. A power assisted steering gear having a pinion meshing with a steering rack, an input shaft and a control valve for controlling the flow of hydraulic fluid which, in use, moves the rack, the pinion and rack being positioned between the input shaft and the valve, the pinion being hollow and accommodating a torsion bar, the steering gear further comprising an input shaft extension which connects the input shaft to the valve, one end of the torsion bar being rotationally fast with respect to the input shaft and the other end being rotationally fast with respect to the pinions, the torsion bar being tubular, and the input shaft extension passing through the torsion bar.

* * * * *